Oct. 3, 1950 R. LAPSLEY 2,524,598
DROP GEAR TRANSMISSION FOR TRUCKS
Filed March 10, 1944 3 Sheets-Sheet 1
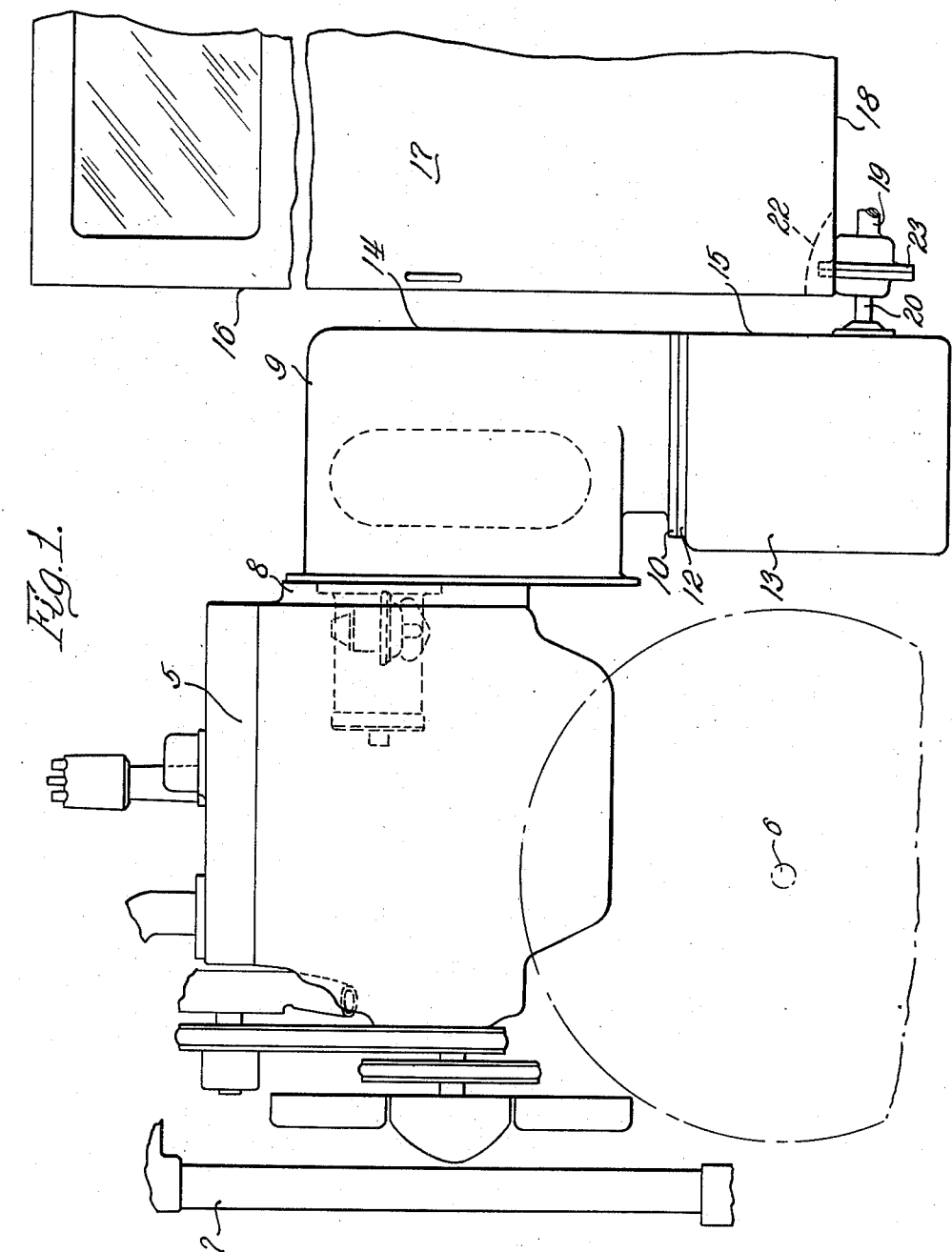
INVENTOR.
Robert Lapsley
BY Walter E. Schirmer
Atty.

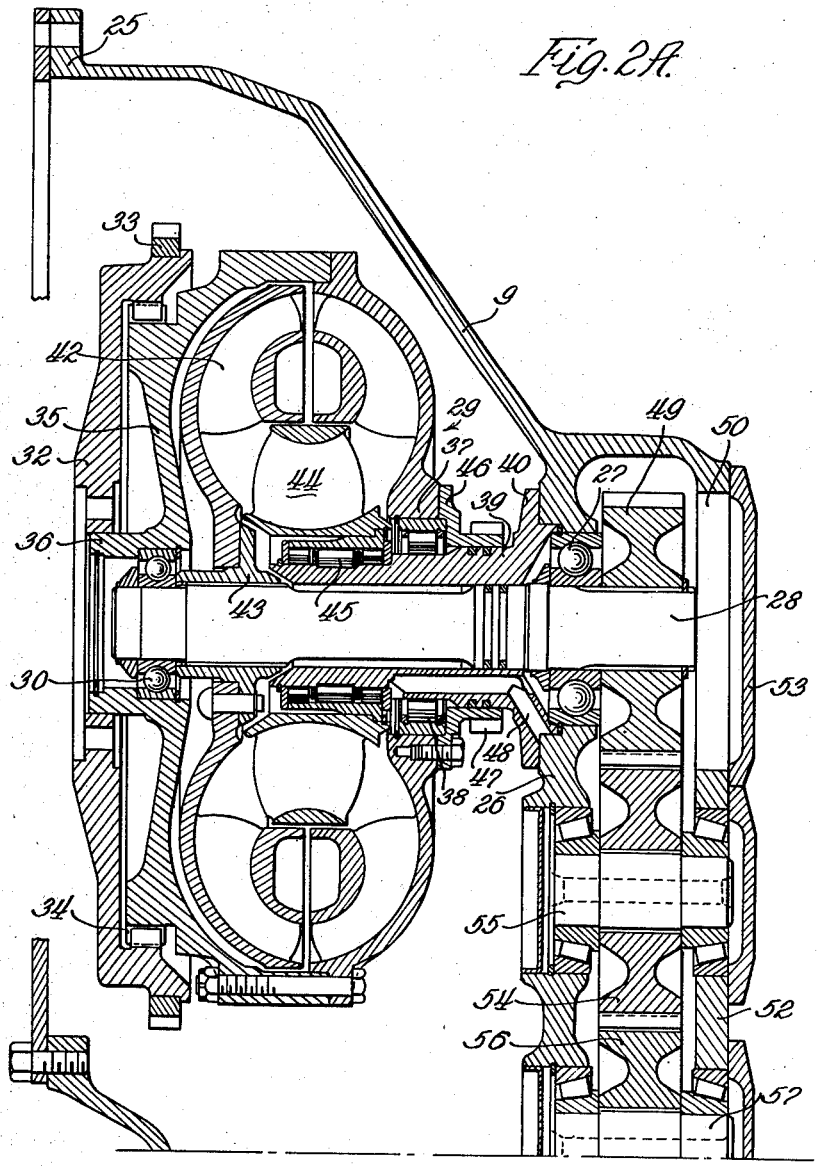

Oct. 3, 1950  R. LAPSLEY  2,524,598
DROP GEAR TRANSMISSION FOR TRUCKS
Filed March 10, 1944  3 Sheets-Sheet 3

INVENTOR.
Robert Lapsley
BY Walter E. Schirmer

Atty.

Patented Oct. 3, 1950

2,524,598

UNITED STATES PATENT OFFICE 2,524,598

DROP GEAR TRANSMISSION FOR TRUCKS

Robert Lapsley, Berrien Springs, Mich., assignor to Clark Equipment Company, Buchanan, Mich., a corporation of Michigan Application March 10, 1944, Serial No. 525,901

10 Claims. (Cl. 180—70)

This invention relates to transmissions, and more particularly is concerned with the novel design of transmission for use in a truck of the house-to-house delivery type known in the trade as a "stand-drive" vehicle in which the operator stands up while driving the vehicle, and the vehicle has full doors on each side thereof, preferably the sliding type providing easy entrance and exit from the vehicle to facilitate intermittent operation thereof.

Such trucks are commonly used for house-to-house delivery of milk, dairy products and similar commodities and one of the primary objectives in the design of such trucks is the lowering of the floor level as far as possible to reduce the height to which the operator must step to enter the vehicle, thus reducing the total work which he must accomplish in his numerous in and out movements in delivering his commodities.

The present invention contemplates a novel type of power transmission drive from the engine to the driving axle of the vehicle which will provide for lowering of the floor level of the vehicle to an extent such as to place this level substantially in the plane of the propeller shaft of the vehicle.

The main feature of the present invention is the provision of a fluid drive transmission which is arranged vertically between the engine and the front vehicle support for the door or transverse passageway of the vehicle, the transmission thereby occupying no space laterally within the transverse passageway.

It is to be noted that in connection with such a construction it is not desirable to lower the mounting of the engine; first, because a high mounting is desirable for providing sufficient space therebelow for proper spring suspension of the front or steering axle and; second, to retain a high mounting of the engine in order to facilitate access thereto for inspection and repair. Consequently, the engine is normally disposed at an appreciable distance above the level of the floor of the vehicle, and the present invention contemplates a transmission construction providing a dropped arrangement so that from the crank shaft of the engine a sufficient drop is produced within the transmission to the output shaft so that the floor of the vehicle can be substantially coplanar with such output shaft.

One of the primary objects of the present invention is to provide a pair of vertically spaced housings, the upper housing enclosing a torque convertor and the lower housing, which is bolted thereto, providing the shiftable gears for the change speed transmission, the two housings being bolted together and the upper housing being piloted on and supported by the engine. With such a construction it is desirable that the rear end of the torque convertor housing and the rear end wall of the change speed gear housing be disposed in substantially the same vertical plane, thereby eliminating any offset which would extend back into the transverse passageway of the vehicle.

Other objects and advantages of the present invention will appear more fully from the following detail description which, taken in conjunction with the accompanying drawings, will disclose to those skilled in the art the particular construction and operation of a preferred form of the present invention.

In the drawings:

Figure 1 is a side view, partly diagrammatic, of an engine and transmission arrangement in relation to the door of the vehicle;

Figure 2A is a vertical sectional view through the torque convertor and upper transmission housing.

Figure 2B:
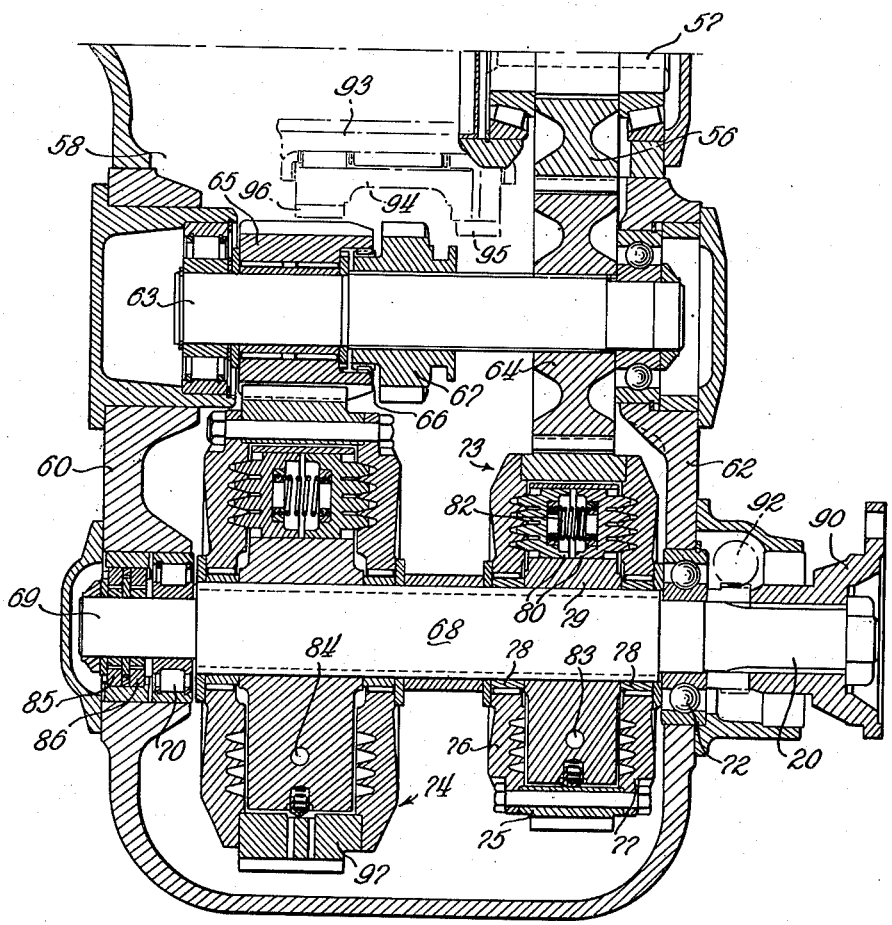
Figure 2B is a vertical sectional view through the lower portion of the transmission housing.

Referring now in detail to Figure 1, there is provided an engine 5 which may be of any conventional type and which is mounted in a suitable manner upon the chassis of the vehicle at a point considerably above the axis of the steering axis 6. The engine 5 has disposed forwardly thereof the radiator 7 and at its rear end is provided with a flanged portion 8 which encloses the flywheel of the engine, which flywheel extends into the housing 9 of the torque convertor portion of the transmission. The housing 9 has a bell shaped vertical flange portion bolted to the flange portion 8 and is provided on its under surface with a planar flange 10 to which is bolted the upper flanged portion 12 of the transmission housing 13.

It will be noted that the rear end wall 14 of the housing 9 and the end wall 15 of the housing 12 are disposed in substantially the same vertical plane and arranged forwardly of the vertical door edge 16. The vehicle preferably is provided with a sliding door 17, which door when opened provides entrance into a transverse passageway extending across the vehicle. It will be noted that the flood 18 of this passageway is disposed a considerable distance below the mating surfaces 10 and 12 of the housings 9 and 13, and in fact, is disposed substantially coplanar with or slightly above the propeller shaft 19 leading to the rear axle of the vehicle to the transmission housing shaft 20. The floor preferably has in the center thereof a slightly raised portion 22 accommodating the coupling 23 between the propeller shaft and the housing shaft 29.

Considering now in detail the transmission construction which is shown in Figure 2A, the housing 9 which contains the torque convertor is piloted on and rigidly secured to the flange 8 of the engine 5 through studs extending through the flange 25 of the housing 9.

The housing 9 is provided with an intermediate vertical partition wall 26 which, adjacent its upper end, has the bearing assembly 27 rotatably supporting the driven shaft 28 of the torque convertor unit indicated generally at 29. The forward end of the shaft 28 is journalled in bearings 30 which in turn are supported in the flywheel of the engine, the flywheel itself being indicated at 32 and being provided with the starter ring gear 33. The flywheel 32 is also provided with an internal gear meshing with an external gear 34 carried by the impeller housing member 35 of the torque convertor. The member 35 is journalled on the bearings 30 and has a hub portion 36 projecting into the central opening in the flywheel 32 to center the shaft and bearing assembly therein. The opposite portion of the impeller housing member is provided with a hub portion 37 rotatably supported on the bearing 38 which, in turn, are journalled on a sleeve member 39 extending about the shaft 28 and rigidly secured by means of the flange portion 40 to the partition wall 25. The convertor 29 also includes a rotor or driven member 42 which is secured to the splined hub 43 locked on the splined portion of shaft 28 whereby operation of the torque convertor results in the rotor 42 driving the shaft 28. Intermediate the impeller and rotor there is indicated the stator member 44 which is rotatably mounted upon a one-way clutch assembly 45 keyed by the inner end of the sleeve 39. This allows the stator to rotate forwardly with the rotor but prevents the stator from reverse rotation.

Bolted to the hub 37 of the impeller housing member is a flanged portion 46 of a gear member 47 which operates as a fluid pressure developing pump for forcing fluid under pressure through the passageway 48 into the torque convertor.

Mounted on the shaft 28 beyond the bearing 27 is a gear member 49 which is keyed or splined to the shaft, and is mounted thereon through the opening 50 in the rear end wall 52 of the housing 9. This opening is preferably closed by a plate member 53 in any conventional manner.

The gear 49 is in constant driving engagement with the idler gear 54 mounted on a shaft 55 which is rotatably journalled in the intermediate wall 26 and the wall 52 of the housing 9 and disposed in vertical alinement below the gear 49. The idler gear 54 in turn is adapted to drive a second idler gear 56 mounted on the rotatable shaft 57 and partly projecting below the plane of the opening 58 formed in the bottom of the housing 9. Bolted to the defining edge of the opening 58 is a transmission case indicated generally at 60 which depends from the housing 9 and arranged to have its rear end wall 62 disposed in substantially the same vertical plane as the end wall 52 of the housing 9. This provides for disposition of the torque convertor and transmission at a position forwardly of a transverse vertical plane extending through the front wall of the transverse passageway of the vehicle so that there is no interference with the vehicle passageway by either the torque convertor housing or the transmission housing.

The gear case 60 is provided with a lay shaft 63 rotatably journalled in the housing 60 and carrying thereon the gear 64 and a rotatable gear 65, the gear 65 having a clutch tooth portion 66 adapted to be engaged by the clutch teeth of a clutch member 67 splined on the shaft 63.

Disposed vertically below the shaft 63 is a main output shaft 68 of the transmission, which shaft is journalled at one end as by means of the reduced portion 69 in the roller bearing assembly 70 and projects through the rear end wall 62 of the transmission, being supported therein by means of the ball bearing assembly 72.

Mounted on the shaft 68 are a pair of specially designed gear members indicated generally at 73 and 74. Considering the gear member 73 in detail, this comprises an annular gear element 75 which has secured to opposite sides thereof the radially extending flange members 76 and 77 which, in turn, are journalled upon suitable needle rollers carried by the bushings 78 mounted on the shaft 68. Thus the gear 73 is arranged for free rotation about the shaft 68.

Keyed on the shaft 68 intermediate the flanges 76 and 77 is a hub member 79 carrying a series of circumferentially spaced oppositely acting pistons 80 normally held in restricted position by means of a spring 82 and arranged to operate when fluid under pressure is introduced therebetween for engagement in wedge-shaped grooves formed annularly in the inner faces of the flanges 76 and 77. Thus, upon introduction of fluid under pressure into the annular port 83 of the hub member 79 the pistons are expanded axially to grip the side flange members 76 and 77, thereby clutching the gear 73 to the shaft 68 for conjoint rotation therewith. This provides a direct drive from the gear 59 driven by the torque convertor through the gear 64 and the gear 73 to the shaft 68.

When it is desired to provide a gear reduction, the gear 74, which is constructed similarly to the gear 73 and is in constant meshing engagement with the gear 65, is driven by introducing fluid under pressure into the port 84 of the gear 74 which clutches this gear to the shaft 68, and since the gear 65 is clutched to shaft 63 through the clutch member 67 the reduced drive is provided from gear 65 through gear 74 to shaft 68.

It is to be understood, of course, that the pistons in the respective gear members are selectively actuated, the pressure of one set of pistons being reduced when the other set of pistons is actuated to uncouple the one gear of the shaft as the other gear is clutched thereto.

Mounted on the reduced end 69 of the shaft 68 are valve controlling distributor members 85 and 86 which are respectively connected to a suitable source of fluid pressure and, in turn, through valve passageways (not shown) extending axially through the shaft 68 deliver fluid under pressure selectively to either of the ports 83 or 84 for selective actuation of the gears 73 and 74.

The details of the piston operation and arrangement of the valve mechanism for controlling the operation of such pistons is disclosed in my copending application Serial No. 526,829 filed March 15, 1944, and since such control forms no part of the present invention it is not believed necessary to describe the same in detail herein.

The shaft 68 as noted extends outwardly through the rear wall 62 of housing 60 and receives the companion flange 90 mounted on the projecting end thereof for coupling this shaft to the propeller shaft leading to the drive axle of the vehicle. Suitable speedometer gearing indicated at 92 is provided for use in any conventional manner.

It will be noted from an analysis of Figure 1 that the extension of shaft 68 indicated at 20 in Figure 1 is disposed in a horizontal plane immediately below the floor of the vehicle so that the vehicle floor can be projected down to a point immediately above the shaft 20. This provides a relatively low step from the ground to the transverse passageway of the vehicle for facilitating the operation of the vehicle by the driver. By disposing the transmission case below the torque convertor housing 9 and reversing the position of the countershaft and main shaft of the transmission, it will be apparent that a much lowered construction is provided to accommodate the desired lowering of the floor of the vehicle. At the same time by disposing the rear end walls 62 and 52 of the respective housings in substantially the same vertical plane it is apparent that there will be no obstruction in the floor or front wall of the passageway caused by the power transmission for the vehicle.

In order to obtain a reverse drive through the transmission, there is provided in a laterally offset position a lay shaft 93 upon which is mounted the compound reverse idler gear 94 having gear teeth 95 adapted to mesh with the clutch gear member 67 when it is shifted to the right. This lay shaft is shown diagrammatically in Figure 2B out of position for the sake of clarity, it actually being positioned below shaft 63 and behind shaft 68. The gear teeth 96 of the gear member 94 are in constant meshing engagement with the gear element 97 of the low speed gear 74 whereby a shift of the clutch gear 67 will produce reverse drive on the shaft 68 from the gear 56 through gear 64 to shaft 63 thence through clutch gear 67 and compound gear 94 to gear element 97. When the clutch element 67 is shifted in the opposite direction it couples the gear 65 to the shaft 63 to provide for low and high speed operation through selective control of the clutch elements within the gears 73 and 74.

It is therefore believed apparent that I have provided a novel type of dropped or lowered drive for a vehicle of the stand-up drive type, and that by reason of the present construction distinct advantages are obtained, facilitating the construction of a vehicle of this type with a greatly lowered floor level and with no obstructions in this floor level caused by transmission parts.

I am aware that various changes may be made in certain details of the construction herein shown and described, and I therefore do not intend to be limited except as defined by the scope and spirit of the appended claims.

I claim:

1. In combination, a housing adapted to be secured to an engine about the flywheel thereof, a torque converter in said housing driven by said engine, a shaft therein driven by said converter, a gear on said shaft, a train of vertically spaced constantly meshing idler gears in alinement with and driven by said shaft gear, the last one of said train projecting out of the bottom of said housing, a gear case secured to the bottom of said housing including a countershaft, an output shaft spaced in said case vertically below said countershaft, and change speed gearing on said shafts driven from said idler train, the rear end walls of said housing and case being substantially in vertical alinement and the forward wall of said case being disposed in substantially vertical alinement with the fly wheel of said engine.

2. In combination, a housing having a bell-shaped flanged portion adapted to be secured to an engine about the flywheel thereof, a fluid torque transmitting unit in said housing driven by said engine and having a driven shaft disposed within said housing and includng a gear thereon, a series of meshing vertically spaced gears driven by said shaft gear and having the lowermost gear thereof projecting out of the bottom of said housing, a gear case secured to the bottom of said housing having a countershaft driven from said gear train, an output shaft disposed below said countershaft, and change speed gearing therebetween, the rear end walls of said housing and case being substantially in vertical alinement, and the forward wall of said case being disposed in substantially vertical alinement with said flywheel.

3. In combination, a housing having its forward end adapted to be secured to an engine about the flywheel thereof, a fluid torque transmitting unit in said housing driven by said engine and having a driven shaft, a vertically arranged series of meshing gears driven from said shaft and having the lowermost gear projecting out of the bottom of said housing, a gear case secured to the bottom of said housing having vertically spaced parallel shafts, the lowermost shaft extending rearwardly out of said case, and change speed gearing between said shafts and driven from said lowermost gear of said series, the rear end walls of said housing and case being in substantially vertical alinement and the forward wall of said case being disposed rearwardly of the forward end of said housing.

4. In combination, a housing adapted to be secured to an engine about the flywheel thereof, a torque transmitting unit in said housing driven from said engine, a vertically depending series of three meshing gears in said housing with the uppermost gear being driven from said unit, said housing having its bottom open, a gear case depending from said housing and secured thereto about said opening, and change speed gearing in said case driven from said lowermost of said series of gears and including an output shaft extending rearwardly out of said case, the rear end walls of said housing and case being in substantially vertical alinement, the gear case being of less axial length than said housing.

5. A transmission for use in a vehicle having front and rear ground engaging wheels and at least a portion of a floor at a relatively low short step level and providing a substantially unobstructed through aisle, a rear drive axle, a propeller shaft extending from the rear axle and under and forwardly of said through aisle for driving said rear axle, and an engine mounted above the front wheel centers with its crank shaft at a relatively high level with relation to the propeller shaft comprising, a housing adapted to be interposed between the engine and the propeller shaft, a driving shaft adapted to be axially aligned with and driven by the crank shaft, a primary change speed shaft mounted below said driving shaft, a train of gears for transmitting drive from said driving shaft to said primary change speed shaft, a secondary change speed shaft mounted below said primary change speed shaft, a change speed gear set for transmitting multi-ratio forward drive or reverse drive from said primary change speed shaft to said secondary change speed shaft, and coupling means adapted for coupling said secondary change speed shaft with said propeller shaft.

6. A transmission for use in a vehicle having an engine and an offset drive shaft connected to an axle, comprising, means adapted to provide driving mechanism between the engine and the drive shaft, said means comprising, a housing having a shorter dimension axially of the drive shaft than the offset distance between the engine and the drive shaft, a hydraulic transmitter in one end of said housing and connected to the engine, fluid operated clutch mechanism in the other end of said housing and connected to the drive shaft, and change speed mechanism in said housing interconnecting said transmitter and said clutch mechanism.

7. The transmission defined in claim 6 in which said housing is divided into two sections, and in which said change speed mechanism is located in the same housing section as said clutch mechanism.

8. A transmission for use in a vehicle of the type having a transverse passageway thereacross provided with a low floor, and an engine for said vehicle disposed entirely above the level of said floor comprising, a fluid torque transmitting unit having a housing adapted to be secured to the engine and having an opening at the bottom thereof, a transmission housing including change speed gearing secured about said opening and depending from said torque transmitting unit housing and having its output shaft adapted to extend rearwardly therefrom below the floor of said passageway, the rear end walls of said torque transmitting unit housing and said transmission housing being adapted to be disposed in substantially the same vertical transverse plane forwardly of said passageway and the forward end walls of said housings being adapted to be disposed rearwardly of said engine.

9. In combination, a housing adapted to be secured to an engine about the flywheel thereof, a torque transmitting unit in said housing driven from said engine, a vertically depending series of meshing gears in said housing with the uppermost gear being driven from said unit, said housing having its bottom open, a gear case depending from said housing and secured thereto about said opening, an output shaft extending rearwardly outwardly of said gear case, the rear end walls of said housing and case being in substantially vertical alignment, and the gear case being of less axial length than said housing, a pair of axially spaced gears rotatable on said output shaft, clutch means associated with each of said rotatable gears on said output shaft for selectively clutching one or the other to said output shaft, a countershaft in said gear case, a gear fixed to said countershaft having constant meshing engagement with one of the rotatable gears on said output shaft and adapted to be driven by the lowermost gear of said meshing gears, a second gear rotatable on said countershaft having constant meshing engagement with the other gear on said output shaft, and a clutch member carried by said countershaft and operable for clutching said second gear to said countershaft.

10. In combination, a housing adapted to be secured to an engine about the flywheel thereof, a torque transmitting unit in said housing driven from said engine, a vertically depending series of meshing gears in said housing with the uppermost gear being driven from said unit, said housing having its bottom open, a gear case depending from said housing and secured thereto about said opening, an output shaft extending rearwardly outwardly of said gear case, the rear end walls of said housing and case being in substantially vertical alignment, and the gear case being of less axial length than said housing, a pair of axially spaced gears rotatable on said output shaft, clutch means associated with each of said rotatable gears on said output shaft for selectively clutching one or the other to said output shaft, a countershaft in said gear case, a gear fixed to said countershaft having constant meshing engagement with one of the rotatable gears on said output shaft and adapted to be driven by the lowermost gear of said meshing gears, a second gear rotatable on said countershaft having constant meshing engagement with the other gear on said output shaft, a clutch member carried by said countershaft and operable for clutching said second gear to said countershaft, a lay shaft, reverse gearing on said lay shaft comprising a gear portion having constant meshing engagement with the rotatable gear on the output shaft having constant meshing engagement with the rotatable gear on said countershaft, and said reverse gearing having a second gear portion adapted to be engaged by a gear portion of said clutch member for selectively drivingly connecting said lay shaft to said countershaft.

ROBERT LAPSLEY.

REFERENCES CITED

The following references are of record in the file of this patent:

UNITED STATES PATENTS

| Number | Name | Date |
|---|---|---|
| 1,038,162 | Levy | Sept. 10, 1912 |
| 1,211,531 | Blomstrom | Jan. 9, 1917 |
| 1,711,094 | Klimek | Apr. 30, 1929 |
| 1,777,966 | Fageol | Oct. 7, 1930 |
| 1,847,114 | Kower et al. | Mar. 1, 1932 |
| 1,990,748 | Oberkircher et al. | Feb. 12, 1935 |
| 2,082,326 | Frisby | June 8, 1937 |
| 2,138,618 | Seyerle | Nov. 29, 1938 |
| 2,228,581 | Olen | Jan. 14, 1941 |
| 2,333,682 | Schneider | Nov. 9, 1943 |
| 2,349,064 | Weaver | May 16, 1944 |

FOREIGN PATENTS

| Number | Country | Date |
|---|---|---|
| 426,622 | Great Britain | Apr. 5, 1935 |
| 427,919 | Great Britain | May 2, 1935 |